US 8,804,239 B2

(12) United States Patent
Qingjun et al.

(10) Patent No.: US 8,804,239 B2
(45) Date of Patent: Aug. 12, 2014

(54) RECESSED SCREEN

(71) Applicant: Elite Screens, Inc., Garden Grove, CA (US)

(72) Inventors: Zhang Qingjun, Shenzhen (CN); Jiang Gengyuan, Shenzhen (CN); Zhu Jing, Shenzhen (CN)

(73) Assignee: Elite Screens, Inc., Garden Grove, CA (US)

( * ) Notice: Subject to any disclaimer, the term of this patent is extended or adjusted under 35 U.S.C. 154(b) by 0 days.

(21) Appl. No.: 13/787,683

(22) Filed: Mar. 6, 2013

(65) Prior Publication Data

US 2013/0235455 A1 Sep. 12, 2013

(30) Foreign Application Priority Data

Mar. 7, 2012 (CN) ...................... 2012 2 0081486 U

(51) Int. Cl.
*G03B 21/58* (2014.01)
*G03B 21/60* (2014.01)
*H04M 1/02* (2006.01)
*G06F 1/16* (2006.01)
*G03B 21/56* (2006.01)

(52) U.S. Cl.
CPC ............... *G03B 21/58* (2013.01); *G03B 21/60* (2013.01); *H04M 1/0268* (2013.01); *G06F 1/1601* (2013.01); *G03B 21/56* (2013.01)
USPC ........................................................ 359/461

(58) Field of Classification Search
CPC ....................................................... G03B 21/58
USPC ................................. 248/240.1; 359/443, 459
See application file for complete search history.

(56) References Cited

U.S. PATENT DOCUMENTS

| | | | |
|---|---|---|---|
| 7,063,424 B1 * | 6/2006 | Brinkman | 353/74 |
| 7,270,423 B2 * | 9/2007 | Katase | 353/79 |
| 7,327,516 B2 * | 2/2008 | Wheeler | 359/443 |
| 7,686,265 B2 * | 3/2010 | Hall | 248/222.11 |
| 7,717,569 B2 * | 5/2010 | Sokeila et al. | 353/69 |
| 7,864,421 B2 * | 1/2011 | Choi | 359/461 |
| 7,942,533 B2 * | 5/2011 | Ganzevoort | 353/79 |
| 8,031,400 B2 * | 10/2011 | Wang et al. | 359/461 |
| 8,089,692 B2 * | 1/2012 | Watanabe et al. | 359/446 |

(Continued)

OTHER PUBLICATIONS

Elite Screens, Elite Screens Projection Company, http://www.elitescreens.com/, Mar. 22, 2004.*

*Primary Examiner* — Clayton E Laballe
*Assistant Examiner* — Kevin Butler
(74) *Attorney, Agent, or Firm* — Charles C.H. Wu; Charles C.H. Wu & Associates, APC

(57) ABSTRACT

The present invention is a display screen projecting apparatus adaptable to be housed inside a wall. An outer shell is defined by a top board, a foot board, a backboard, a pair of side boards and a front panel. The outer shell comprising a synchronous motor designed to rotate on a synchronous motor bracket. The synchronous motor drives a shaft via a coupling means. A directional axis is configured to accommodate the shaft. A plurality of gears is inserted into the shaft and the shaft is capable of driving the plurality of gears. A cloth projector screen is attached to a cloth shaft. The display screen projecting apparatus employs a rotate and slide mechanism to automatically extend the cloth projector screen outwards from inside the wall. When not in use, the cloth projector screen automatically retracts back into the wall.

12 Claims, 4 Drawing Sheets

(56) References Cited

U.S. PATENT DOCUMENTS

| | | | |
|---|---|---|---|
| 8,159,745 B2* | 4/2012 | Abe et al. | 359/461 |
| 8,169,697 B2* | 5/2012 | Katsuma | 359/443 |
| 8,184,369 B2* | 5/2012 | Kuroi | 359/461 |
| 8,254,024 B2* | 8/2012 | Giammarinaro, Jr. | 359/450 |
| 8,437,080 B2* | 5/2013 | Wang | 359/444 |
| 2008/0030853 A1* | 2/2008 | Creel | 359/461 |
| 2008/0204870 A1* | 8/2008 | Choi | 359/461 |
| 2008/0231815 A1* | 9/2008 | Ganzevoort | 353/79 |
| 2009/0033886 A1* | 2/2009 | Jones | 353/94 |
| 2009/0116106 A1* | 5/2009 | Adams et al. | 359/443 |
| 2009/0185269 A1* | 7/2009 | Chung et al. | 359/450 |
| 2009/0190212 A1* | 7/2009 | Wang et al. | 359/461 |
| 2009/0268164 A1* | 10/2009 | Bowden et al. | 353/13 |
| 2009/0268285 A1* | 10/2009 | Suteau | 359/443 |
| 2009/0284834 A1* | 11/2009 | Chen | 359/461 |
| 2009/0318258 A1* | 12/2009 | Yang | 475/343 |
| 2010/0007949 A1* | 1/2010 | Clawson et al. | 359/443 |
| 2010/0008798 A1* | 1/2010 | Clawson et al. | 417/312 |
| 2010/0053747 A1* | 3/2010 | Maruyama | 359/443 |
| 2010/0065704 A1* | 3/2010 | Liu | 248/274.1 |
| 2010/0079860 A1* | 4/2010 | Unno et al. | 359/443 |
| 2010/0201950 A1* | 8/2010 | Budinger et al. | 353/13 |
| 2010/0238544 A1* | 9/2010 | Elliott et al. | 359/443 |
| 2011/0026114 A1* | 2/2011 | Abe et al. | 359/461 |
| 2011/0032612 A1* | 2/2011 | Abe et al. | 359/461 |
| 2011/0141559 A1* | 6/2011 | Kuroi | 359/461 |
| 2011/0199678 A1* | 8/2011 | Kuroi | 359/461 |
| 2011/0205622 A1* | 8/2011 | Enochs | 359/461 |
| 2011/0235173 A1* | 9/2011 | Tsai Chen | 359/461 |
| 2011/0235174 A1* | 9/2011 | Chai Chen | 359/461 |
| 2011/0304823 A1* | 12/2011 | Wensing et al. | 353/15 |
| 2011/0304908 A1* | 12/2011 | Giammarinaro, Jr. | 359/450 |
| 2012/0008202 A1* | 1/2012 | Choi | 359/459 |
| 2012/0075697 A1* | 3/2012 | Astill | 359/461 |
| 2012/0080154 A1* | 4/2012 | O'Farrill Haro | 160/377 |
| 2012/0147463 A1* | 6/2012 | Jung et al. | 359/443 |
| 2012/0162760 A1* | 6/2012 | Chen | 359/461 |
| 2012/0169999 A1* | 7/2012 | Cavendish et al. | 353/10 |
| 2012/0236267 A1* | 9/2012 | Yamagishi | 353/85 |
| 2012/0249977 A1* | 10/2012 | Abri et al. | 353/69 |
| 2012/0268815 A1* | 10/2012 | Hendricks | 359/461 |
| 2012/0287502 A1* | 11/2012 | Hajjar | 359/455 |
| 2012/0314285 A1* | 12/2012 | Wang | 359/444 |
| 2013/0075518 A1* | 3/2013 | Dodd | 242/390 |

* cited by examiner

RECESSED SCREEN

CROSS-REFERENCE TO RELATED APPLICATION

This application claims priority of Application No. 201220081486.2 filed in China on Mar. 7, 2012.

BACKGROUND OF THE DISCLOSURE

1. Technical Field of the Invention

The present embodiment relates in general to display screens. More specifically, the present embodiment relates to a display screen projecting apparatus adaptable to be housed inside a wall, designed to drop and retract according to the needs of a user.

2. Description of the Related Art

Wall-mountable screens are well-known in the art. Wall-mountable screens are placed on the wall and can be found in a wide variety of commercial buildings, hospitals, homes and the like. Most of the wall-mountable display device consumes too much space and are unsafe since they are fitted onto the wall.

Some wall-mountable devices have mounting structures including wires from which the device is hung. Others have mounting structures comprised of mounting extensions which are fitted to the wall or ceiling.

Conventional-wall mountable screens have considerable drawbacks. For example, an existing system includes a wall-hanging display apparatus equipped with a wall side attachment member fixed to a wall and an apparatus side attachment member connected to the wall side attachment member for hanging the display apparatus on the wall. The wall hanging display apparatus can reduce the time and effort required for attaching the components for hanging the screen on the wall. However, the display apparatus is fixed to a wall which can consume too much space.

A variant to this system uses a mounting system for a flat panel display including a back assembly, a pair of arm assemblies, and a mounting assembly. The back assembly includes a slide plate connected to the arm assemblies allowing arm assemblies and mount assembly to be horizontally shifted without the need to remove the mount from the wall and reattach it. Mounting assembly can include a tilt head that provides a path of rotation about a substantially horizontal axis allowing easy adjustment and rotation of display. However, the rotation of the system on the horizontal axis can result in the collapse of the wall mounting system, causing damage or bodily injury to people.

Hence, it can be seen, that there is a need for a wall hanging display screen projecting apparatus which can drop and retract according to the needs of the user. Such a device would utilize cloth as screen. This needed device would push the cloth screen outwards from inside the wall. Moreover, the device is very discreet, adaptive to surrounding circumstances, and can save a lot of space over existing devices.

SUMMARY OF THE EMBODIMENT

The present invention is a display screen projecting apparatus adaptable to be housed inside a wall comprising an outer shell. The outer shell is defined by a top board, a foot board, a backboard, a pair of side boards and a front panel. The outer shell comprising a synchronous motor designed to rotate on a synchronous motor bracket. The synchronous motor bracket is attached to the foot board of the outer shell. An optical axis or a shaft is connected to the synchronous motor and the synchronous motor drives the shaft via a coupling means. A directional axis is configured to accommodate the shaft. The directional axis helps to accomplish steadiness in signal transmission. A plurality of gears is inserted into the shaft and the shaft is capable to drive the plurality of gears. A plurality of gear racks is positioned to engage the plurality of gears. The plurality of gear racks is mounted on a plurality of guiding rails installed inside the outer shell. The plurality of guiding rails is aligned parallel to each other. A main bracket is attached to the plurality of guiding rails, the main bracket moves back and forth along the plurality of guiding rails. A plurality of panel brackets is attached to the main bracket. The plurality of panel brackets is designed to accommodate the front panel. A pair of shock reducing glues or insert caps is fitted to the main bracket. The pair of insert caps is capable to eliminate the noise caused by internal signal transmission and makes the signal transmission steadier. A cloth axis or cloth shaft is installed between the pair of insert caps. A tube-shaped motor is installed on one end of the cloth shaft and the tube-shaped motor drives the cloth shaft. A control panel is installed inside the outer shell and the control panel controls the tube shaped motor. The control panel controls the electric circuit board to help the electrical machinery to run the tube shaped motor. A cloth projector screen is attached to the cloth shaft. A top portion of the cloth projector screen is wrapped around the cloth shaft and a lower axis is affixed to a lower portion of the cloth projector screen. A driving head installed on one end of the cloth shaft is inserted into the pair of insert caps. One end of the driving head can rotate freely when driven by the tube shaped motor. The driving head can pass the rotational force of the tube shaped motor to a cloth shaft. An approaching switch installed on the backboard of the outer shell is capable to control the movement of the main bracket which serves as a testing and aligning tool. The display screen projecting apparatus utilizes the cloth projector screen to expand and retract according to the need of the user which is very discreet, adaptive to surrounding circumstances, and saves a lot of space.

The display screen projecting apparatus employs a suitable rotate and slide mechanism like motorized rotating hook to push the cloth projector screen outwards from inside the wall. The cloth projector screen launches automatically when in use and retracts back when not in use. The cloth projector screen wrap around the cloth shaft when the display screen projecting apparatus retracts and the synchronous motor rotates in the reverse direction to retract the main bracket until the approaching switch sounds off detecting the signal. When the main bracket retracts accurately, the front panel blocks the opening of an outer shell and thereby stops the rotation of the synchronous motor. The material used for making the cloth projector screen can be selected from a group consisting of cloth, textile material and the like.

One objective of the present invention is to provide a display screen projecting apparatus having a cloth projector screen adaptable to automatically expand and retract according to the need of a user.

A second objective of the present invention is to provide the display screen projecting apparatus having a suitable rotate and slide mechanism to push the cloth projector screen outwards from inside the wall.

A third objective of the present invention is to provide the display screen which is very discreet, adaptive to surrounding circumstances, and saves a lot of space.

A fourth objective of the present invention is to provide a display screen projecting apparatus that will hide the cloth projector screen wound within an outer shell behind the wall.

A fifth objective of the present invention is to provide a display screen projecting apparatus that can prevent falling of the cloth projector screen when outside force is applied.

A sixth objective of the present invention is to provide a display screen projecting apparatus that would launch the cloth projector screen to an ideal distance from the wall.

These and other advantages and features of the present invention are described with specificity so as to make the present invention understandable to one of ordinary skill in the art.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
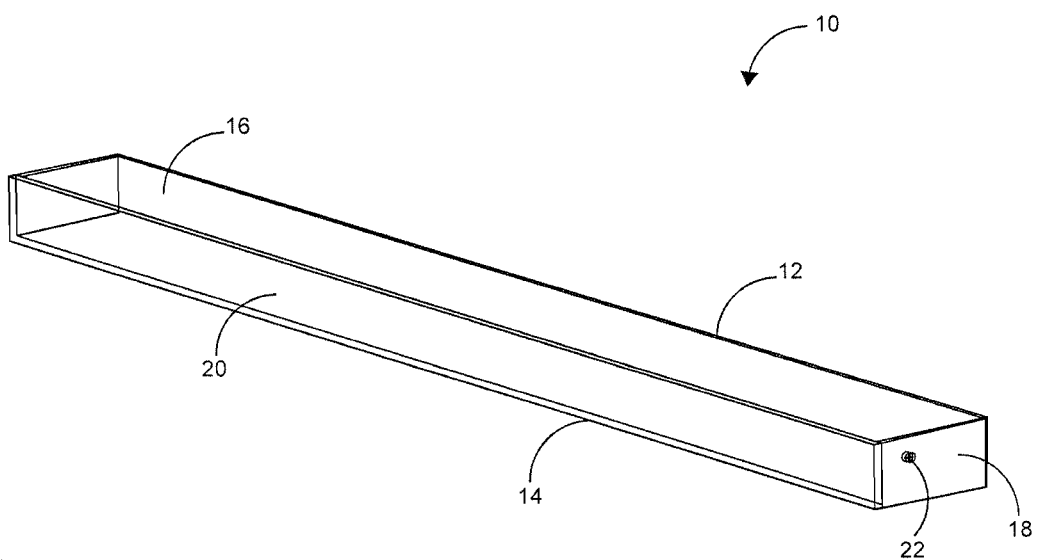
FIG. 1 shows a main body defining an outer shell of a display screen projecting apparatus adaptable to be housed inside a wall.

FIG. 1 shows a main body defining an outer shell of a display screen projecting apparatus 10 adaptable to be housed inside a wall. The outer shell of the display screen projecting apparatus 10 comprising a top board 12, a foot board 14, a backboard 16, a pair of side boards 18 and a front panel 20. A fastener 22 attached to the pair of side boards 18 for firmly holding a cloth shaft (not shown) to the pair of side boards when placed inside the outer shell of the display screen projecting apparatus 10. The top board 12, the foot board 14, the backboard 16 and the pair of side boards 18 are fitted together to form a casing of the outer shell. The outer shell is attachable to the wall or any vertical surface by any mechanical means. The display screen projecting apparatus 10 can be fixed on to the surface of the wall or recessed within the wall saving ample amount of space. The mechanical attachment means will keep the display screen projecting apparatus 10 in position without falling due to its own weight and from external forces. The front panel 20 of the display screen projecting apparatus 10 is capable to move forward and backward automatically from the outer shell. The control mechanism attached with the motor gear assembly placed inside the outer casing enables the automatic forward and backward movement of the front panel 20. A cloth projector screen (not shown) is wound inside the outer shell of the display screen projecting apparatus 10 around a cloth shaft (not shown) and the cloth shaft is rotatably fixed in one position using the fastener 22 attached to the pair of side boards 18. The top board 12 forms a top cover of the rectangular box shaped display screen projecting apparatus 10.

Figure 2:
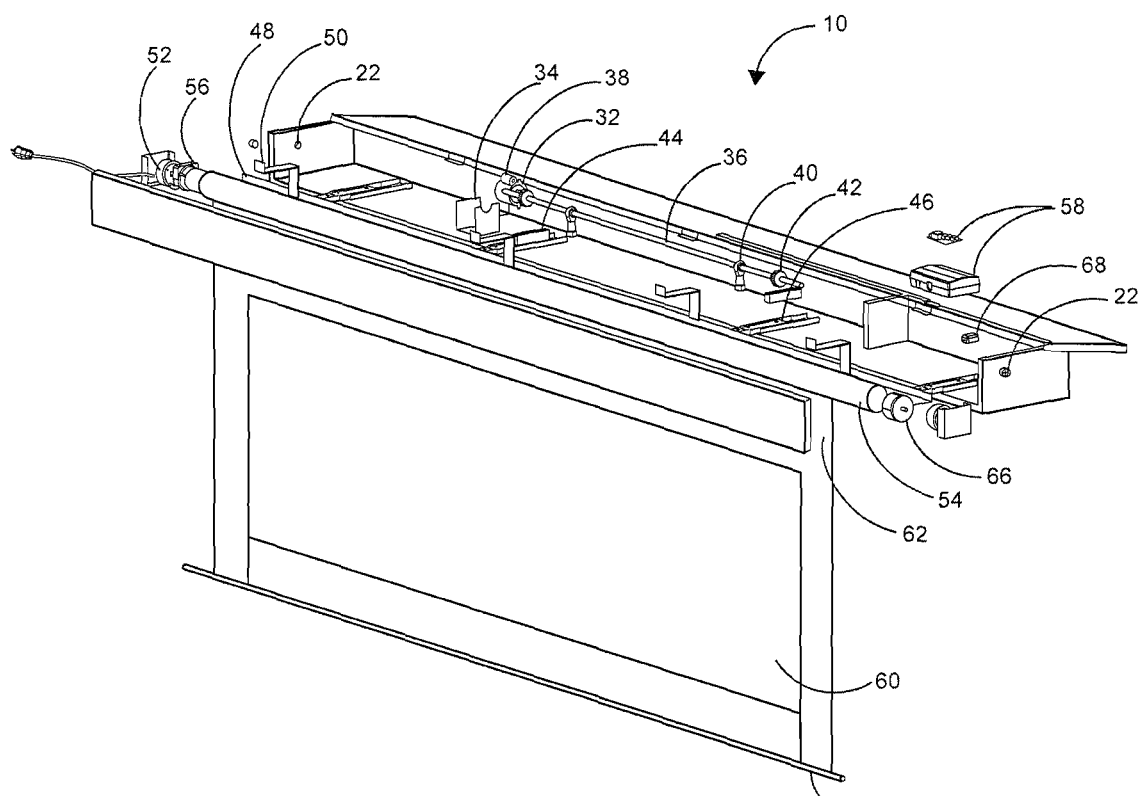
FIG. 2 shows an interior structure showing disassembled parts located inside the outer shell of the display screen projecting apparatus.

FIG. 2 shows an interior structure of the outer shell of the display screen projecting apparatus 10 showing the functional elements located inside the outer shell with a cloth projector screen 60 extend outward. The outer shell of the display screen projecting apparatus 10 comprising a synchronous motor 32 designed to rotate on a synchronous motor bracket 34. The synchronous motor bracket 34 is attached to the foot board 14 of the outer shell of the display screen projecting apparatus 10. A shaft 36 is connected to the synchronous motor 32 and the synchronous motor 32 drives the shaft 36 via a coupling means 38. A directional axis 40 is configured to be coupled to the shaft 36. The directional axis 40 helps to stabilize the shaft for signal transmission. A plurality of gears 42 is inserted into the shaft 36 and the shaft 36 is capable to drive the plurality of gears 42. A plurality of gear racks 44 is positioned to engage the plurality of gears 42. The plurality of gear racks 44 is mounted on a plurality of guiding rails 46 installed inside the outer shell 10. The plurality of guiding rails 46 is aligned parallel to each other. A main bracket 48 is attached to the plurality of guiding rails 46, the main bracket 48 moves back and forth along the plurality of guiding rails 46. A plurality of panel brackets 50 is attached to the main bracket 48. The plurality of panel brackets 50 are designed to accommodate the front panel 20. A pair of insert caps 52 is fitted to the main bracket 48. The pair of insert caps is capable to eliminate the noise caused by internal signal transmission and makes the signal transmission steadier. A cloth shaft 54 is installed between the pair of insert caps 52. A tube-shaped motor 56 is installed on one end of the cloth shaft 54 and the tube-shaped motor 56 drives the cloth shaft 54. A control panel 58 is installed inside the outer shell 10 and the control panel 58 controls the tube shaped motor 56. The control panel 58 controls the electric circuit board to help the electrical machinery to run the tube shaped motor 56. A cloth projector screen 60 is attached to the cloth shaft 54. A top portion 62 of the cloth projector screen 60 is wrapped around the cloth shaft 54 and a lower axis 64 is affixed to a lower portion of the cloth projector screen 60. A driving head 66 installed on one end of the cloth shaft 54 is inserted into the pair of insert caps 52. One end of the driving head 66 can rotate freely when driven by the tube shaped motor 56. The driving head 66 can pass the rotational force of the tube shaped motor 56 to a cloth shaft. An approaching switch 68 installed on the backboard 16 of the outer shell of the display screen projecting apparatus 10 is capable to control the movement of the main bracket 48 which serve as a testing and aligning tool. The display screen projecting apparatus utilizes the cloth projector screen 60 to expand and retract according to the need of the user which is very discreet, adaptive to surrounding circumstances, and saves a lot of space.

When the display screen projecting apparatus 10 is kept in a non operative mode, i.e. when the power input to the display screen projecting apparatus 10 is disconnected, the cloth projector screen 60 is completely wrapped around the cloth shaft 54. The outer shell of the display screen projecting apparatus 10 be in a completely closed state with the front panel 20 attached to the rest of the fixed parts of the outer shell. The outer shell of the display screen projecting apparatus 10 can be fixed on the surface of the wall, projecting forward from the surface. This arrangement may consume a small amount of space on the wall and sometimes it may not be that much aesthetically pleasing. For getting even more aesthetically pleasing appearance, the outer shell of the display screen projecting apparatus 10 can be recessed within the wall. In this type of configuration, only the front panel 20 is visible from outside when the display screen projecting apparatus 10 is in a closed or "OFF" state. When the power input to the display screen projecting apparatus 10 is switched on and operated, the front panel 20 will push forward itself from the surface of the wall unwinding and releasing the cloth projector screen 60. After completing the presentation or use of the display screen projecting apparatus 10, the user can signal to rewind the cloth projector screen 60 around the cloth shaft 54. Once the cloth projector screen 60 is completely wound around the cloth shaft 54, the front panel 20 will move backwards and will completely close the outer shell of the display screen projecting apparatus 10. The display screen projecting apparatus 10 can be made completely hidden inside the wall without noticing. The outer shell of the display screen projecting apparatus 10 supports the entire electrical and associated mechanical components installed to control the movement of the cloth projector screen 60. The outer shell may be made of any metal sheets and is made by firmly fixing the top board 12, the foot board 14, the backboard 16 and the pair of side boards 18 together. The front panel 20 is movable and is not directly fixed with the outer shell of the display screen projecting apparatus 10.

The display screen projecting apparatus 10 starts operating after receiving signals from the control panel 58. The control panel 58 is electrically wired with the tube shaped motor 56, the synchronous motor 32 and the approaching switch 68. The display screen projecting apparatus 10 operates based on, first with the forward and backward linear movements of the plurality of guiding rails 46 and associated components installed on an inner side of the outer shell and secondly with the rotation of the cloth shaft 54. The cloth shaft is a component extending from the tube-shaped motor 56, which drives the cloth shaft 54 to wind and unwind the cloth projector screen 60.

The display screen projecting apparatus 10 can be operated by the user either signaling through a wired means or by sending signals to the control panel 58 through any wireless means from a distance. When the user signals to start the operation of the display screen projecting apparatus 10 the control panel 58 receives the signal. The synchronous motor 32 starts rotating at a predetermined constant speed when the control panel sends a control signal to the synchronous motor 32. The synchronous motor 32 which is installed on the synchronous motor bracket 34 is coupled mechanically to the shaft 36 through the coupling means 38. The rotation of the synchronous motor 32 is transferred to the shaft 36 through the coupling means 38 and the shaft 36 rotates at the same speed or at a reduced speed, speed reduced by a speed reduction means (not shown) associated with the coupling means 38 or the speed is reduced by controlling the synchronous motor 32. The rotation of the synchronous motor 32 and associated components are aimed at the forward and reverse movement of the front panel 20 of the outer shell. The rotation of the synchronous motor 32, which is installed inside the outer shell, rotates the coupled optical axis 36. The shaft 36 is firmly fixed on the foot board 14 of the outer shell using the plurality of directional axis 40. The directional axis 40 component has a circular loop in a top portion and the shaft 36 is passed through the circular loops. The shaft 36 is installed inside the directional axis 40. The circular loop on the directional axis 40 allows the free rotation of the shaft 36 and also limits the movement of the shaft 36 within a limit to accomplish steadiness in signal transmission. Thus a smooth operation of the display screen projecting apparatus 10 is accomplished.

The plurality of gears 42 inserted and fixed onto the shaft 36 at predetermined locations engages with the plurality of gear racks 44. The number of gear racks 44 is the same as the plurality of gears 42. The corresponding gear 42 and gear racks 44 ratchets together and can drive the gear racks 44 via the plurality of gears 42. The plurality of gear racks 44 are firmly attached to a top plate of the plurality of guiding rails 46. The plurality of guiding rails 46 includes a top plate and a bottom plate. The bottom plate of the plurality of guiding rails 46 are firmly attached to inner side of the foot board 14 forming the outer shell. The top plate of the plurality of guiding rails 46 is movable in a forward and backward direction on the bottom plate. The plurality of guiding rails 46 is aligned parallel to each other for obtaining a linear motion within the outer shell of the display screen projecting apparatus 10. The main bracket 48 is attached to an end of the top plate of the plurality of guiding rails 46. Since the top plate of the plurality of guiding rails 46 are movable in linear direction, the attached main bracket 48 moves back and forth along the plurality of guiding rails 46. The cloth shaft 54 is rotatably fixed in one position using the fastener 22 attached to the pair of side boards 18. The main bracket 48 is attached with the plurality of panel brackets 50 and the plurality of panel brackets 50 are designed to accommodate or attach with the front panel 20. When the main bracket 48 moves back and forth along the plurality of guiding rails 46, the attached front panel 20 also moves back and forth leaving a small width to unwind and roll down the cloth projector screen 60.

The cloth shaft 54, around which the cloth projector screen 60 is wound around, is rotatably fixed on both ends. At one end of the cloth shaft it is attached with the tube-shaped motor 56 and at another end the driving head 66 is attached. The tube-shaped motor 56 is placed inside the insert caps 52 and the insert caps 52 is fixed with the fastener 22 attached to the pair of side boards 18. Each of the insert caps 52 fitted to the tube-shaped motor 56 and the driving head 66 will eliminate the noise caused by internal signal transmission and makes the signal transmission steadier. The control panel 58 controls the electric circuit board to help the electrical machinery to run the tube shaped motor 56. The top portion 62 of the cloth projector screen 60 is wrapped around the cloth shaft 54 and the lower axis 64 is affixed to a lower portion of the cloth projector screen 60. One end of the driving head 66 can rotate and thereby passing the rotational force of the tube shaped motor 56 to a cloth shaft.

In operation, the control panel 58 signals to start the synchronous motor 32 and the coupling means 38 transfers the rotation onto the shaft 36 which in turn rotates the attached gears 42. The rotation of the plurality of gears 42 moves the plurality of gear racks 44 attached on the top plate of the plurality of guiding rails 46. The movement of the gear racks 44 moves the top plate of the plurality of guiding rails 46 as it is fixed on the top plate. As the top plate of the plurality of guiding rails 46 moves forward pushing the attached main bracket 48, the front panel 20 moves forward. The front panel 20 now creates a small gap with the outer shell of the display screen projecting apparatus 10. When the front panel 20 is completely moved forward, the control panel 58 signals the synchronous motor 32 to stop rotation. Now the control panel 58 signals the tube shaped motor 56 to start operation and the rotation of the tube shaped motor 56 drives the cloth shaft 54. With the rotation of the cloth shaft 54 the lower axis 64 of the cloth projector screen 60 moves down. The tube shaped motor 56 is rotated till the cloth projector screen 60 is unwounded completely. Now the cloth projector screen 60 will hang down from the cloth shaft 54.

After completing the use of the cloth projector screen 60 the user may signal the control panel 58 to wind up the cloth projector screen 60. Now the tube shaped motor 56 is rotated in opposite direction to wind the cloth projector screen 60 around the cloth shaft 54. After completely winding the cloth projector screen 60 the tube shaped motor 56 stops and the synchronous motor 32 is rotated to move the front panel 20 backwards to close the outer shell with the cloth projector screen 60 completely wound inside. When this unit retracts, cloth projector screen 60 first wraps around cloth shaft 54 and the synchronous motor 32 rotates the other direction to pull back the front panel 20 until the approaching switch 68 on the backboard 12 of outer shell sounds off detecting signal. This means the front panel 20 is retracted correctly. At this point, the front panel 20 blocks the opening of outer shell and the synchronous motor 32 stops rotating. The approaching switch 68 installed on the backboard 16 of the outer shell controls the movement of the main bracket 48. The approaching switch 68 provided on the side boards 18 and the backboard 16 serves as the testing and aligning tool for the moving components inside the outer shell.

Figure 3:
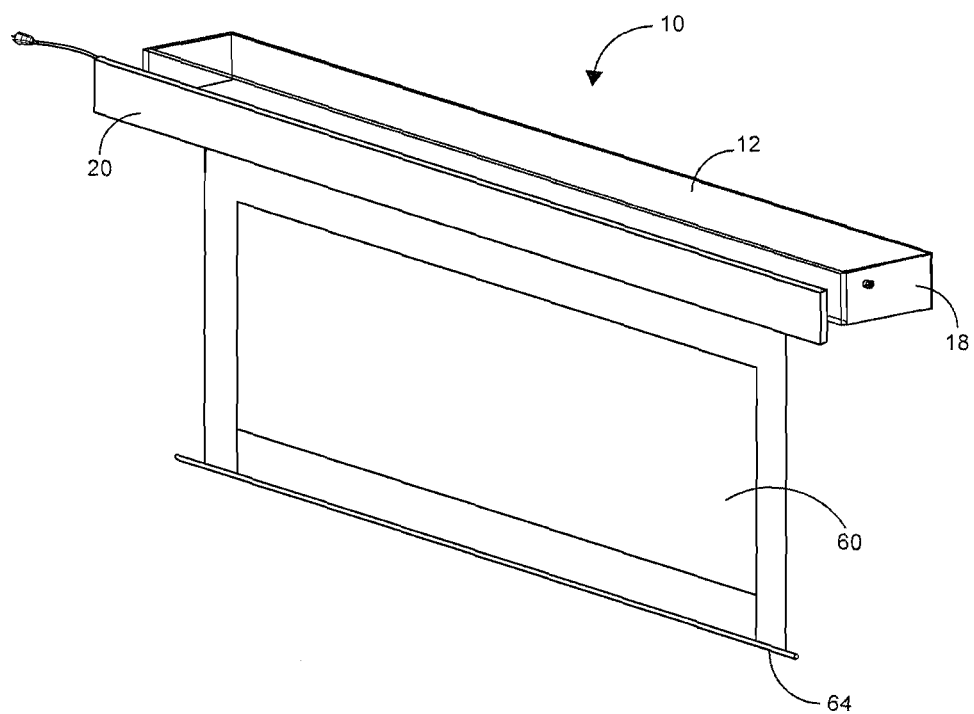
FIG. 3 shows the cloth projector screen in use extended outward from inside of the outer shell.

FIG. 3 shows the cloth projector screen 60 in use, extended outward from inside the outer shell. The display screen projecting apparatus 10 employs a suitable rotate and slide mechanism to launch the cloth projector screen 60 outwards from inside the wall. The cloth projector screen 60 launches automatically when in use and retracts back when not in use. The cloth projector screen 60 wrap around the cloth shaft 54 when the display screen projecting apparatus retracts and the synchronous motor 32 rotates in the reverse direction to retract the main bracket 48 until the approaching switch 68 sounds off detecting the signal. When the main bracket 48 retracts accurately, the front panel 20 blocks the opening of an outer shell and thereby stops the rotation of the synchronous motor 32. The material used for making the cloth projector screen 60 can be selected from a group consisting of cloth, textile material and the like.

The cloth projector screen 60 hanging from the cloth shaft 54 of the outer shell of the display screen projecting apparatus 10 saves a lot of space by replacing the conventional wall hanging means. Since the entire outer shell can be recessed within the wall, the audiences may only see the front panel 20. Also the cloth projector screen 60 hanging from the cloth shaft 54 will not fall down, unlike the hanged screens, when an accidental external force is applied. This is even helpful for continuous presentations and the display screen projecting apparatus 10 also avoids the need for a separate space for storing the rolled cloth projector screen 60. In an embodiment the front panel 20 of the display screen projecting apparatus 10 may have different shapes, designs and colors for improving the appearance so that the front panel 20 can be used as decorative panel.

Figure 4:
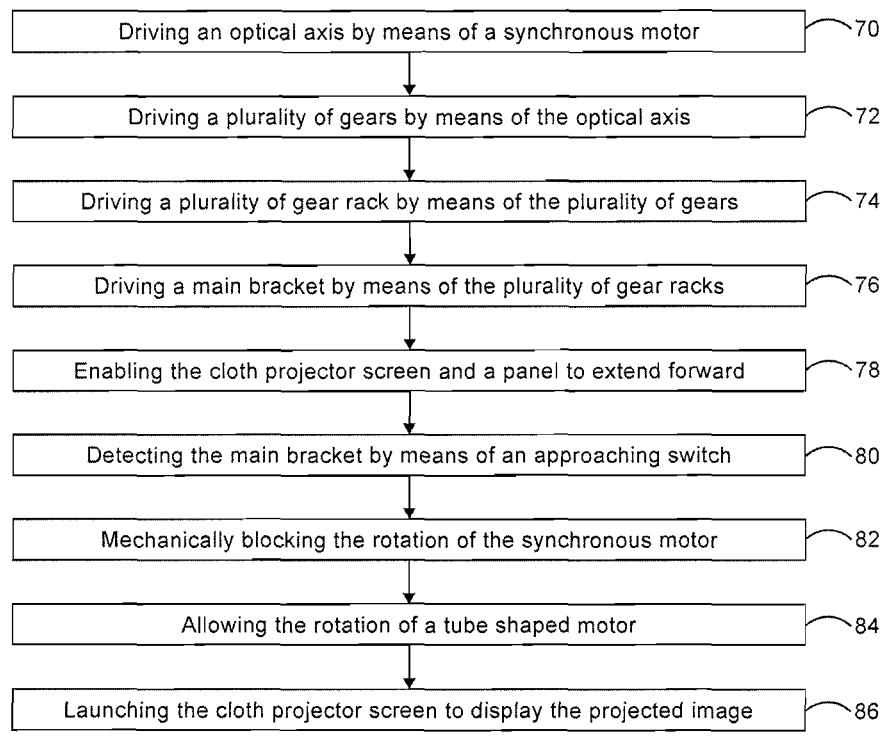
FIG. 4 shows a flow chart illustrating a method for launching a cloth projector screen to display a projected image on the cloth projector screen of the display screen projecting apparatus.

FIG. 4 shows a flow chart illustrating a method for launching a cloth projector screen to display a projected image. The method is initiated by driving a shaft by means of a synchronous motor as indicated at block 70. Then as shown in block 72 the shaft drives a plurality of gears. Thereafter, the plurality of gears drives a plurality of gear rack as shown in block 74. Thereafter as indicated at block 76 the plurality of gear racks drive a main bracket. And then enable the cloth projector screen and a panel to extend forward as shown in block 78. As shown in block 80 an approaching switch detects the main bracket. Then the rotation of the synchronous motor is mechanically blocked as shown in block 82. Then allow the rotation of a tube shaped motor as shown in block 84 and finally launch the cloth projector screen to display the projected image as indicated at block 86.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A retractable display screen projecting apparatus adaptable to be housed inside a wall comprising:
    an outer shell, the outer shell being defined by a top board, a foot board, a backboard, a pair of side boards and a front panel;
    wherein the outer shell comprises:
        a synchronous motor designed to rotate on a synchronous motor bracket, the synchronous motor bracket being attached to the foot board;
    a shaft connected to the synchronous motor, the synchronous motor driving the shaft;
        a directional axis coupled to the shaft, the directional axis being designed to stabilize the shaft for signal transmission;
        a plurality of gears inserted into the shaft, wherein the shaft drives the plurality of gears;
        a plurality of gear racks being positioned to engage the plurality of gears, the plurality of gear racks being mounted on a plurality of guiding rails installed inside the outer shell, the plurality of guiding rails being aligned parallel to each other;
        a main bracket attached to the plurality of guiding rails, wherein the main bracket moves back and forth along the plurality of guiding rails;
        a plurality of panel brackets attached to the main bracket, the plurality of panel brackets mounted to the front panel;
        a pair of insert caps being fitted to the main bracket;
        a cloth shaft installed between the pair of insert caps;
        a tube-shaped motor installed on one end of the cloth shaft for driving the cloth shaft;
        a control panel being installed inside the outer shell, wherein the control panel controls the tube shaped motor;
        a cloth projector screen attached to the cloth shaft, a top portion of the cloth projector screen being wrapped around the cloth shaft and a lower shaft being affixed to a lower portion of the cloth projector screen;
        a driving head installed on one end of the cloth shaft, the driving head being inserted into the pair of insert caps; and
        an approaching switch installed on the backboard of the outer shell being capable to control the movement of the main bracket and serving as a testing and aligning tool;
    whereby the display screen projecting apparatus, utilizes the cloth projector screen to expand and retract according to the needs of a user.

2. The display screen projecting apparatus of claim 1 wherein the cloth projector screen can be placed on the interior surface of a wall.

3. The display screen projecting apparatus of claim 1 wherein the display screen projecting apparatus employs a rotate and slide mechanism to launch the cloth projector screen outwards from inside the outer shell.

4. The display screen projecting apparatus of claim 1 wherein the cloth projector screen launches and retracts back automatically when activated by the user.

5. The display screen projecting apparatus of claim 1 wherein the insert cap is capable to eliminate the noise caused by internal signal transmission and makes the signal transmission steadier.

6. The display screen projecting apparatus of claim 1 wherein the material used for making the cloth projector screen can be selected from a group consisting of cloth, fabric and the like.

7. The display screen projecting apparatus of claim 1 wherein the approaching switch is installed on the backboard and the pair of side boards of the outer shell for detecting the line of movement of the main bracket and serves as the testing and aligning tool.

8. A method for launching a cloth projector screen to display a projected image on a display screen projecting apparatus, the method comprising the steps of:
   (a) driving a shaft by means of a synchronous motor;
   (b) driving a plurality of gears by means of the shaft;
   (c) driving a plurality of gear rack by means of the plurality of gears;
   (d) driving the main bracket by means of the plurality of gear racks;
   (e) enabling the cloth projector screen and a panel to extend forward;
   (f) detecting the main bracket by means of an approaching switch;
   (g) mechanically blocking the rotation of the synchronous motor;
   (h) allowing rotation of a tube shaped motor; and
   (i) launching the cloth projector screen to display the projected image.

9. The method of claim 8 wherein the cloth projector screen launches automatically when in use and retracts back when not in use.

10. The method of claim 8 wherein the cloth projector screen wraps around the cloth shaft when the display screen projecting apparatus retracts and the synchronous motor rotates in the reverse direction to retract the main bracket until the approaching switch sounds off detecting the signal.

11. The method of claim 10 wherein when the main bracket retracts accurately, the panel blocks the opening of an outer shell and thereby stops the rotation of the synchronous motor.

12. The method of claim 8 wherein the display screen projecting apparatus can be placed inside the surface of a wall with a front panel of the outer shell being visible to a user.

* * * * *